(12) United States Patent
Wood et al.

(10) Patent No.: US 11,371,381 B2
(45) Date of Patent: Jun. 28, 2022

(54) SHAFT MONITORING SYSTEM (71) Applicant: ROLLS-ROYCE plc, London (GB)

(72) Inventors: Laura E Wood, Derby (GB); Julius K Listianto, Derby (GB); Kareem W Rodgers, Derby (GB); Dominic J Anelli, Derby (GB)

(73) Assignee: ROLLS-ROYCE PLC, London (GB)

(*) Notice: Subject to any disclaimer, the term of this patent is extended or adjusted under 35 U.S.C. 154(b) by 107 days.

(21) Appl. No.: 16/747,695

(22) Filed: Jan. 21, 2020

(65) Prior Publication Data
US 2020/0240285 A1 Jul. 30, 2020

(30) Foreign Application Priority Data
Jan. 28, 2019 (GB) ...................... 1901112

(51) Int. Cl.
*F01D 21/00* (2006.01)
*F02C 7/36* (2006.01)
(Continued)

(52) U.S. Cl.
CPC .............. *F01D 21/003* (2013.01); *F02C 7/36* (2013.01); *G01D 5/14* (2013.01); *G01D 5/24457* (2013.01);
(Continued)

(58) Field of Classification Search
None
See application file for complete search history.

(56) References Cited

U.S. PATENT DOCUMENTS

| 4,833,405 A | 5/1989 | Richards et al. |
| 6,737,861 B2 | 5/2004 | Lantto |

(Continued)

FOREIGN PATENT DOCUMENTS

| DE | 39 02 809 A1 | 8/1989 |
| DE | 694 20 781 T2 | 5/2000 |

(Continued)

OTHER PUBLICATIONS

Jun. 24, 2020 extended Search Report issued in European Patent Application No. 20150204.4.
(Continued)

*Primary Examiner* — Juan G Flores
(74) *Attorney, Agent, or Firm* — Oliff PLC (57) ABSTRACT

A monitoring system includes first and second, axially adjacent, phonic wheels formed from respective axially adjacent portions of a unitary annular body and mounted coaxially to the shaft for rotation therewith. The first and second phonic wheels have respective first and second circumferential rows of teeth. The system further includes a sensor configured to detect the passage of the first row of teeth by generating a first alternating measurement signal component, and to detect the passage of the second row of teeth by generating a second alternating measurement signal component. The sensor generates a signal having both the first and the second alternating measurement signal components when axially positioned midway between the first and second phonic wheels. The teeth of the first and second rows are configured such that the first alternating measurement signal component has an identical frequency to the second alternating measurement signal component.

11 Claims, 6 Drawing Sheets

(51) Int. Cl.
*G01D 5/14* (2006.01)
*G01D 5/244* (2006.01)

(52) U.S. Cl.
CPC ...... *F05D 2220/32* (2013.01); *F05D 2240/60* (2013.01)

(56) References Cited

U.S. PATENT DOCUMENTS

| | | | |
|---|---|---|---|
| 9,423,233 B2 | 8/2016 | Holt et al. | |
| 2003/0122541 A1 | 7/2003 | Lantto | |
| 2005/0035759 A1 | 2/2005 | Herbert et al. | |
| 2016/0313139 A1* | 10/2016 | Klecka | C23C 24/04 |
| 2017/0115320 A1 | 4/2017 | Turner et al. | |
| 2020/0200789 A1* | 6/2020 | Shepherd | F01D 17/06 |

FOREIGN PATENT DOCUMENTS

| | | | |
|---|---|---|---|
| DE | 10 2009 002 374 A1 | 10/2010 | |
| DE | 10 2013 221 056 A1 | 4/2015 | |
| EP | 0287214 A2 | 10/1988 | |
| EP | 0353076 A2 | 1/1990 | |
| EP | 3128332 A2 | 2/2017 | |
| FR | 2921974 A1 * | 4/2009 | ........... F01D 21/003 |
| FR | 2921974 A1 | 4/2009 | |
| WO | WO-8907058 A1 * | 8/1989 | ........... G01D 5/2451 |
| WO | WO8907058 A1 | 8/1989 | |
| WO | WO0153774 A1 | 7/2001 | |
| WO | 2018/195053 A1 | 10/2018 | |

OTHER PUBLICATIONS

Search Report of the Intellectual Property Office of the United Kingdom for GB1901112.1 with search date of Jul. 29, 2019.

* cited by examiner

SHAFT MONITORING SYSTEM

CROSS-REFERENCE TO RELATED APPLICATIONS

This specification is based upon and claims the benefit of priority from UK Patent Application Number 1901112.1 filed on 28 Jan. 2019, the entire contents of which are incorporated herein by reference.

BACKGROUND

Field of the Disclosure

The present disclosure relates to a shaft monitoring system, and in particular, to a monitoring system for monitoring the axial position of a rotating shaft.

Description of the Related Art

In a gas turbine engine, impending or actual failure of a shaft or of an axial location bearing of the shaft can be accompanied by axial movement of the shaft. Thus it is desirable to monitor the axial position of such a shaft so that suitable automatic or crew-initiated corrective action, e.g. engine shut down, can be performed to prevent the failure progressing.

Figure 11:
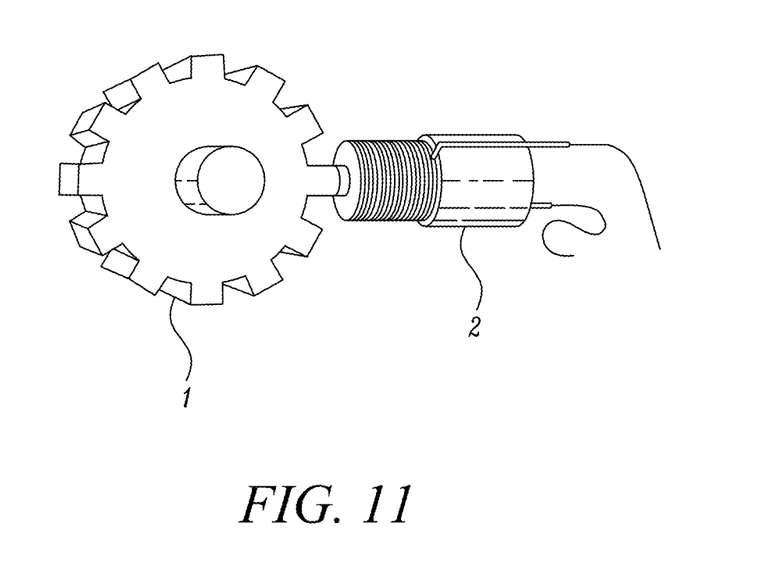
FIG. 11 shows schematically a conventional phonic wheel having a circumferential row of teeth, and a variable reluctance sensor.

Conventionally, phonic wheels and associated sensors are used to measure shaft speed. For example, FIG. 11 shows schematically a phonic wheel 1 having a circumferential row of teeth, and a variable reluctance sensor 2 which detects the passage of the row of teeth by generating an alternating measurement signal. As each tooth of the phonic wheels passes close to the front face of a pole piece of the sensor there is a change in the magnetic flux experienced by a conductive wire wrapped around the pole piece, owing to the change in the reluctance of the magnetic circuit consisting of the pole piece, the phonic wheel and the air gap between the two.

The present invention is at least partly based on a realisation that such wheels can be adapted to monitoring the axial position of the shaft.

SUMMARY

According to a first aspect there is provided a monitoring system for monitoring the axial position of a rotating shaft, the system including:

first and second, axially adjacent, phonic wheels which are formed from respective axially adjacent portions of a unitary annular body and mounted coaxially to the shaft for rotation therewith, the first and second phonic wheels having respective first and second circumferential rows of teeth; and a sensor configured to detect the passage of the first row of teeth by generating a first alternating measurement signal component, and to detect the passage of the second row of teeth by generating a second alternating measurement signal component, the sensor generating a signal having both the first and the second alternating measurement signal components when axially positioned midway between the first and second phonic wheels;

wherein the teeth of the first and second rows are configured such that the first alternating measurement signal component generated by the sensor has an identical frequency to the second alternating measurement signal component generated by the sensor, the first and second rows of teeth being angularly misaligned such that the first and second alternating measurement signal components are phase shifted relative to each other; and wherein axial displacement of the shaft causes the signal generated by the sensor to vary the amplitude of the first component relative to the amplitude of the second component whereby the axial position of the shaft can be monitored.

Thus advantageously a single sensor suitably located relative to the phonic wheels may provide a single signal for detecting shaft axial displacement. In addition, the sensor may be used to measure shaft speed based on the signal.

Optional features of the present disclosure will now be set out. These are applicable singly or in any combination with any aspect of the present disclosure.

Typically the phonic wheels are axially adjacent but arranged such that the first and second circumferential rows of teeth are axially non-overlapping.

The first and second rows of teeth may be configured such that the first alternating measurement signal component generated by the sensor when the sensor is axially aligned with the first row has a substantially identical amplitude to the second alternating measurement signal component generated by the sensor when the sensor is axially aligned with the second row.

Except for the angular misalignment, the teeth of the first row may be substantially identical to the teeth of the second row.

The teeth of the first row may have a constant height across the axial width of the first phonic wheel, and the teeth of the second row may have a constant height across the axial width of the second phonic wheel.

The first and second rows of teeth may be angularly misaligned such that the first and second alternating measurement signal components are 180° phase shifted relative to each other.

Conveniently, in a normal operating mode of the shaft, the amplitude of the first component may be substantially equal to the amplitude of the second component.

The sensor may be a magnetic sensor that detects a varying reluctance caused by the passage of the rows of teeth.

The first and/or the second row of teeth may be interrupted by a special tooth from which the sensor generates a once-per-revolution signal, the special tooth being configured such that the amplitude of the once-per-revolution signal is different from the amplitude of the respective alternating measurement signal component. Such a once-per-revolution signal may be useful for engine health monitoring purposes.

According to a second aspect there is provided a gas turbine engine for an aircraft comprising:

an engine core comprising a turbine, a compressor, and a core shaft connecting the turbine to the compressor; and the monitoring system according to the first aspect for monitoring the axial position of the core shaft, the first and second, axially adjacent, phonic wheels being mounted coaxially to the core shaft for rotation therewith.

According to a third aspect there is provided a gas turbine engine for an aircraft comprising:

an engine core comprising a turbine, a compressor, and a core shaft connecting the turbine to the compressor;

a fan located upstream of the engine core, the fan comprising a plurality of fan blades; and a gearbox that receives an input from the core shaft and outputs drive to the fan via an output shaft so as to drive the fan at a lower rotational speed than the core shaft;

a thrust shaft that extends through the gearbox to connect the fan to an axial location bearing mounted on the core shaft, thereby relieving the output shaft of responsibility for axially locating the fan relative to the core shaft; and the monitoring system according to the first aspect for monitoring the axial position of the thrust shaft, the first and second, axially adjacent, phonic wheels being mounted coaxially to the thrust shaft for rotation therewith.

The gas turbine engine of the second or third aspect may further comprise an engine electronic controller which is operatively connected to the monitoring system to receive the signal generated by the sensor and is configured to monitor therefrom the axial position of the shaft to which the first and second phonic wheels are mounted. The engine electronic controller may also convert the signal into a shaft speed based on the frequency of the signal. In this case, the engine electronic controller may monitor the axial position of the shaft to which the first and second phonic wheels are mounted on the basis of an apparent change in speed of the shaft.

According to a fourth aspect there is provided the use of the monitoring system of the first aspect for monitoring the axial position of a rotating shaft (e.g. the core shaft of the second aspect or a thrust shaft of the third aspect) to which the first and second phonic wheels are mounted. A related aspect provides a method of monitoring the axial position of the rotating shaft, the method comprising:

providing the monitoring system of the first aspect, the first and second phonic wheels being mounted to the rotating shaft; and using the signal generated by the monitoring system to monitor the axial position of the shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/Utip^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1 s, 105 Nkg-1 s, 100 Nkg-1 s, 95 Nkg-1 s, 90 Nkg-1 s, 85 Nkg-1 s or 80 Nkg-1 s. The specific thrust may be in an inclusive range bounded by any two of the values in the previous sentence (i.e. the values may form upper or lower bounds), for example in the range of from 80 Nkg-1 s to 100 Nkg-1 s, or 85 Nkg-1 s to 95 Nkg-1 s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
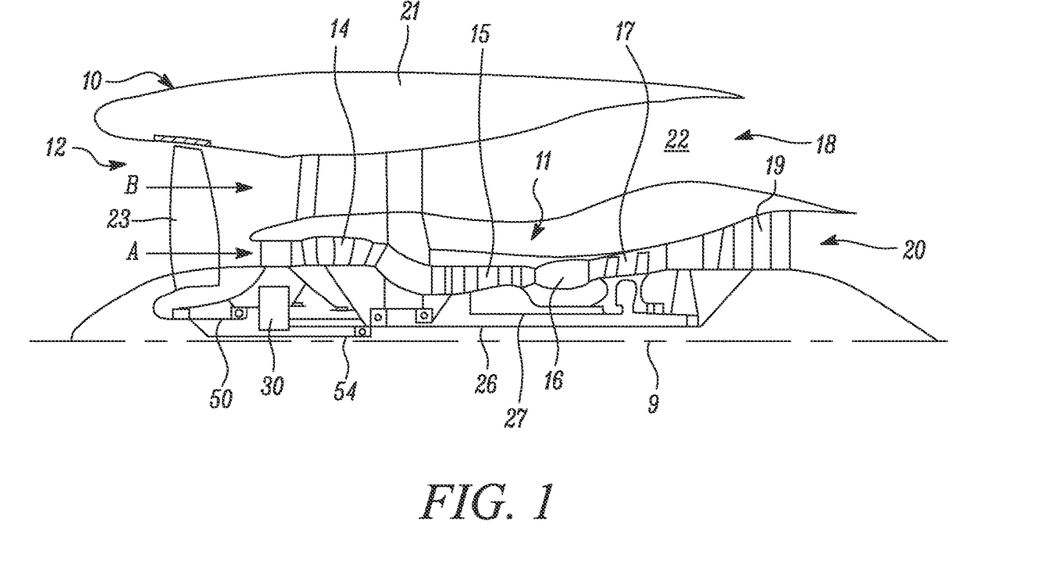
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
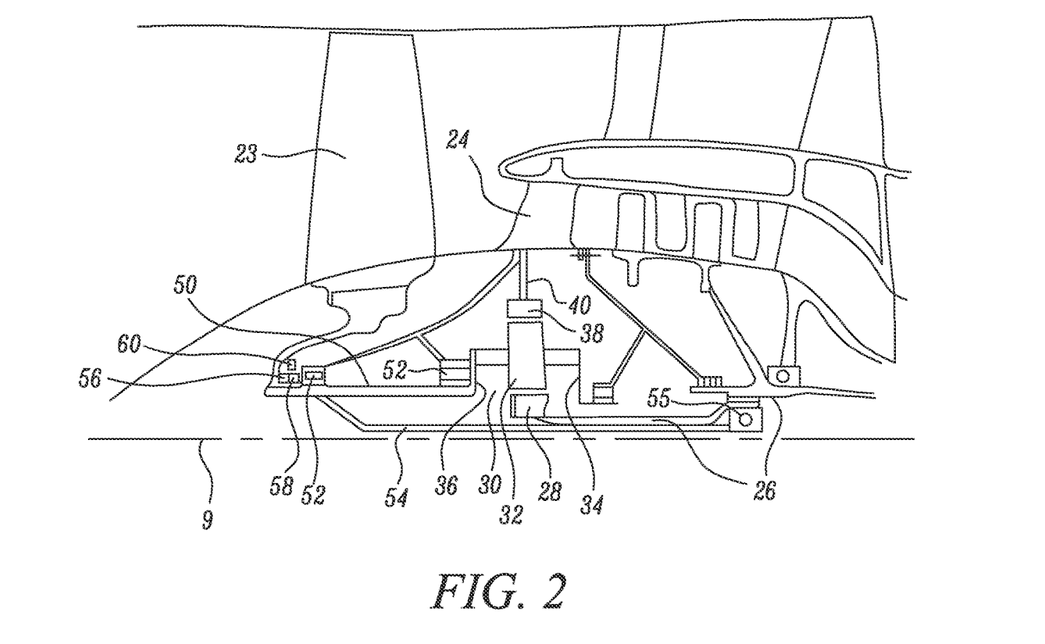
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
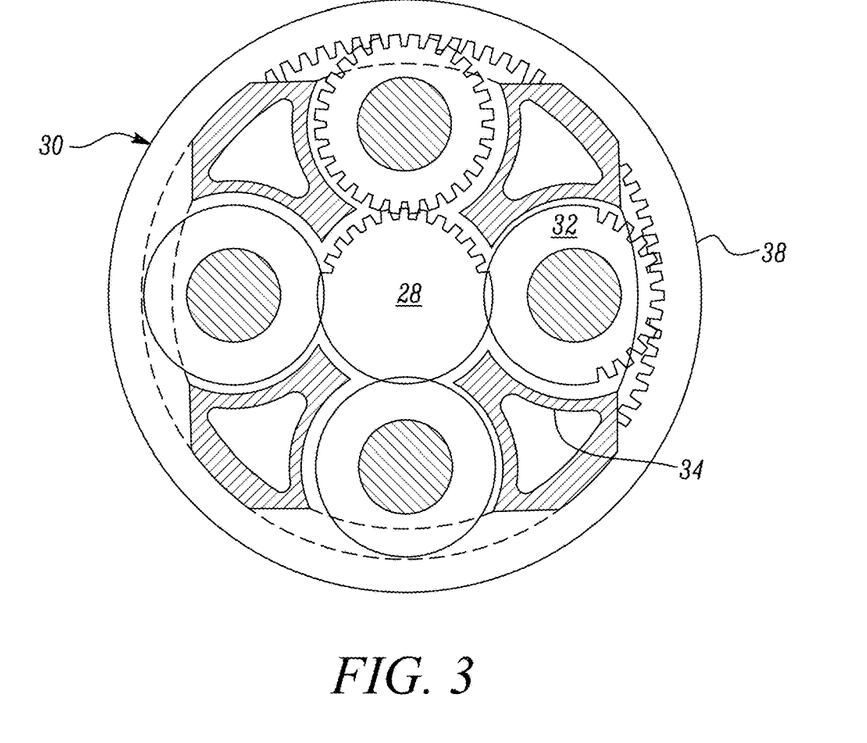
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the exemplary arrangement for a geared fan gas turbine engine 10 shown in FIG. 2, the output shaft 50 from the epicyclic gear arrangement 30 is radially located at each end by sets of roller bearings 52. These allow the shaft to transmit torque to the fan 23, but not provide significant axial retention functionality. To axially retain the output shaft 50 and the fan 23, a separate thrust shaft 54 extends from a set of ball bearings 55 attached to the interconnecting shaft 26, through the centre of the sun gear 28 to join to the output shaft 50. Thus torque transmission and axial retention responsibilities are split between the output shaft 50 and the thrust shaft 54.

Failure of the thrust shaft 54 or the ball bearings 55 can endanger the engine, and thus it is desirable to have early detection of any axial displacement of the shaft 54. Accordingly, the engine also has a monitoring system for monitoring the axial position of the shaft. This system comprises first 56 and second 58 axially adjacent phonic wheels. Conveniently these can be mounted at the front of the output shaft 50 coaxially with the thrust shaft 54. At this location they co-rotate with the entire assembly of the fan 23, output shaft 50 and thrust shaft 54.

Figure 4:
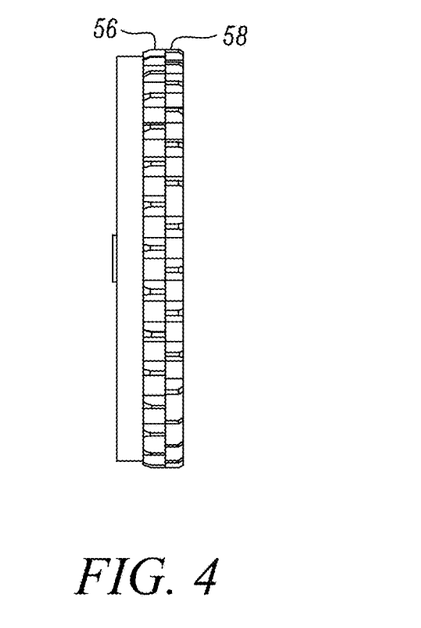
FIG. 4 shows an example of the first and second phonic wheels formed as part of a unitary annular body.

FIG. 4 shows an example of the first 56 and second 58 phonic wheels in more detail. Conveniently, they can be part of a unitary annular body. Each wheel has a circumferential row of teeth, the second row of the second phonic wheel 58 having the same number of teeth (thirty as drawn) as the first row of the first phonic wheel 56. However, the first and second rows of teeth are misaligned, such that every tooth of each row is angularly midway between two adjacent teeth of the other row. Aside from this misalignment, the teeth of the first row are substantially identical to the teeth of the second row.

The system further has a sensor for detecting the passage of the teeth in the form of a reluctance probe 60 which is mounted to a stationary structure of the engine. The teeth of the first 56 and second 58 wheels respectively contribute first and second alternating components to a total alternating measurement signal generated by the probe.

Figure 5:
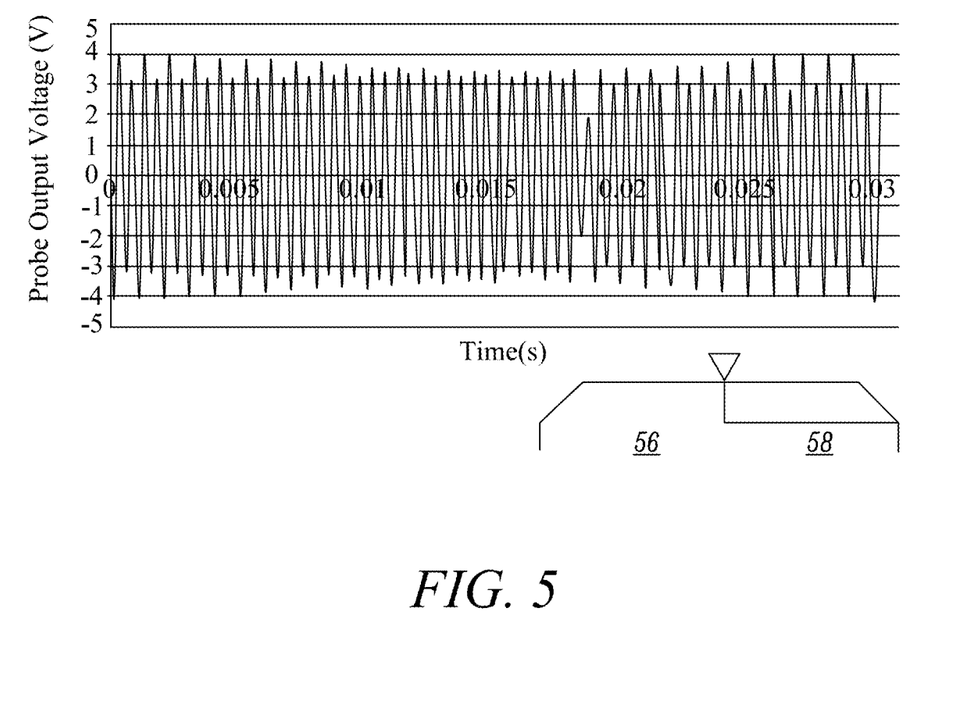
FIG. 5 shows a plot of the output voltage signal generated by a probe when it is axially located near to the midway position between the first and second phonic wheels.

FIG. 5 shows a plot of the output voltage signal generated by the probe 60 when it is axially located near to the midway position between the first 56 and second 58 phonic wheels, as indicated by the arrow in the schematic side view of neighbouring teeth from the two wheels at bottom right of the plot. Essentially the signal contains two sinewaves of equal amplitude phase shifted 180° relative to each other by the misalignment of the teeth of the two rows.

Figure 6:
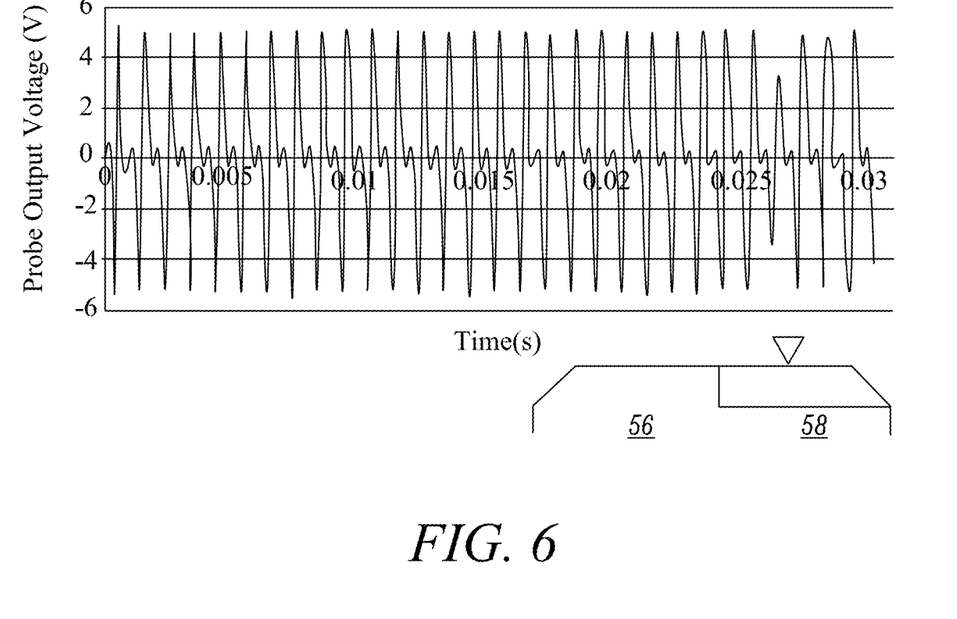
FIG. 6 shows a plot of the output voltage signal generated by a probe when it is axially located at the centre position of the second phonic wheel.

However, when the probe 60 moves from the midway position between the rows, every other voltage peak decreases in amplitude, as shown in FIG. 6 which plots the output voltage signal generated by the probe 60 when it is axially positioned at the centre of the second wheel 58. More particularly, in this example, the first alternating component reduces because of the relative movement which distances the probe from the first wheel 56, while the second alternating component maintains its amplitude because the height of the teeth of each row does not vary across the axial width of its wheel.

In the plots of both FIGS. 5 and 6, the reduction in signal amplitude for just one cycle is a once-per-revolution event caused a special tooth of reduced height of the second wheel 58.

Ideally, in a normal operating mode of the shaft 54, the output signal generated by the probe 60 is as shown in FIG. 5 with the probe being located at the midway position. In practice, assembly tolerances can cause the probe to be located off-centre. However, the high/low amplitude ratio of the alternating amplitude signal which such an off-centre location produces can be monitored and normalised. Significant change in the ratio can still be detected and used to indicate axial displacement of the probe relative to the wheel. In particular, changes in which the drop in alternate voltage peaks drops by a predetermined margin below that of the reduced height tooth peak can be detected.

Figure 7:
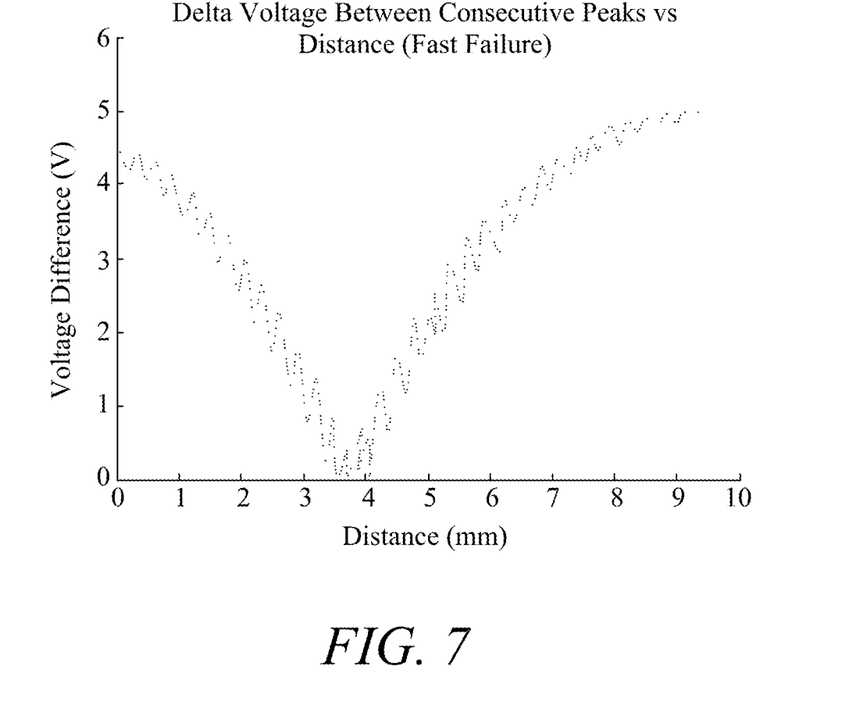
FIG. 7 shows a plot of measured difference between consecutive high/low amplitudes against relative axial position of a probe which is being axially translated across the first and second phonic wheels at a given rotational speed of the shaft.

FIG. 7 shows a plot of measured difference between consecutive high/low amplitudes against relative axial position of a probe which is being axially translated across the wheels at a given rotational speed of the shaft. The midway position is at a distance of about 3.8 mm where the plotted differences dip to zero. As expected, the plotted differences increase with increasing distance to either side away from the midway position. These differences oscillate at the one per revolution frequency of the shaft about an average which monotonically increases with increasing distance, the oscillation being due to an effect of manufacturing tolerances in the machining of the phonic wheel teeth.

The signal is typically received by an engine electronic controller (EEC) of the engine, which uses the signal as a measure of the rotational speed of the assembly of the fan 23, output shaft 50 and shaft 54. Conveniently, the EEC may use a zero-crossing approach in which it identifies voltage peaks above a given threshold, which can be set at a predetermined margin below the reduced signal peak of the reduced height tooth, and then identifies the zero-crossings which follow the peaks. Knowing the angular spacing between the alternating teeth of the two rows then allows the EEC to calculate the shaft speed from the time difference between zero-crossings. Apparent changes in the speed as-measured by this approach can be used to identify a shaft axial shift. The relation between the amplitude ratio of alternate voltage peaks and axial shift may vary as a function of rotational speed, but this variation can be accounted for.

Figure 8:
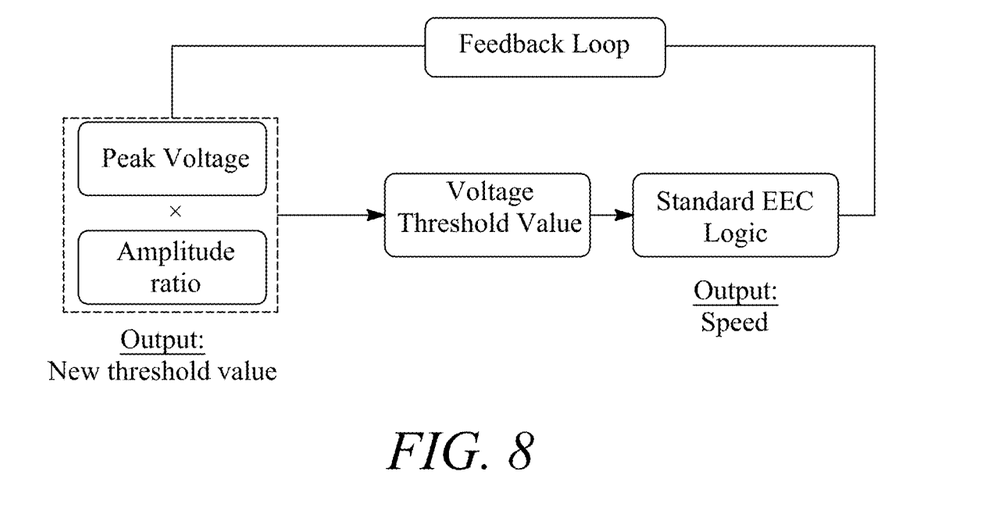
FIG. 8 shows schematically a feedback loop process used by the EEC to monitor shaft axial position.
Figure 9:
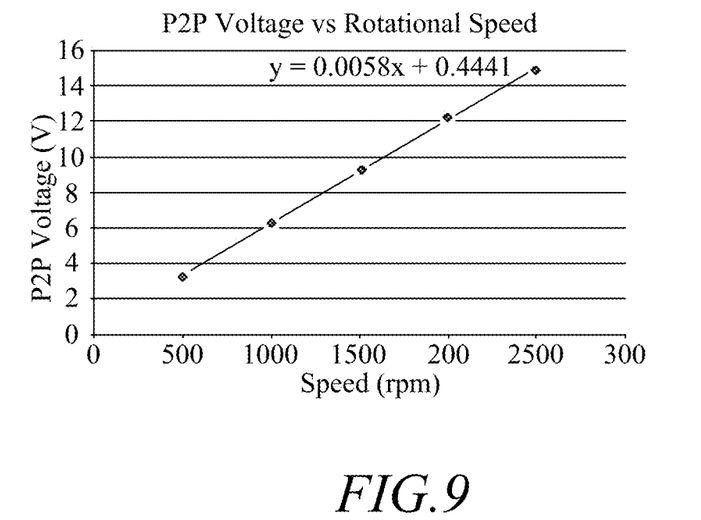
FIG. 9 provides an example of variation in peak to peak voltage ratio of the probe signal with shaft speed for a given shaft axial shift.

FIG. 8 shows schematically a feedback loop process used by the EEC to monitor the shaft axial position, and FIG. 9 provides an example of how the peak to peak (P2P) voltage ratio of the probe signal varies with shaft speed for a given shift. Standard EEC logic (e.g. based on zero-crossings) calculates the shaft speed, and this is then used to set a suitable peak threshold to detect the given axial shift. In particular, the expected (i.e. most recently detected) maximum peak voltage is multiplied by the P2P voltage ratio obtained from the relation of FIG. 9, and a new peak threshold value is set (at the predetermined margin below the peak of the reduced height tooth peak). If the shaft continues at the same speed and does not move axially beyond the threshold shift, the measured shaft speed will remain constant as the peak heights stay above the threshold. However, if the shaft moves a distance greater than the given shift, the smaller voltage peaks drop below the threshold. This instantaneously results in the calculated shaft speed being halved, which is a reliable indicator of shaft movement above the given shift.

Once the calculated speed has halved, the EEC can alert the crew of thrust shaft failure or can initiate an automatic response so that appropriate engine management actions are taken. The EEC can also break the feedback loop to stop the threshold changing.

Using this approach, shaft shifts of at least 5 mm, and more preferably at least 2 mm, can be detected.

Figure 10:
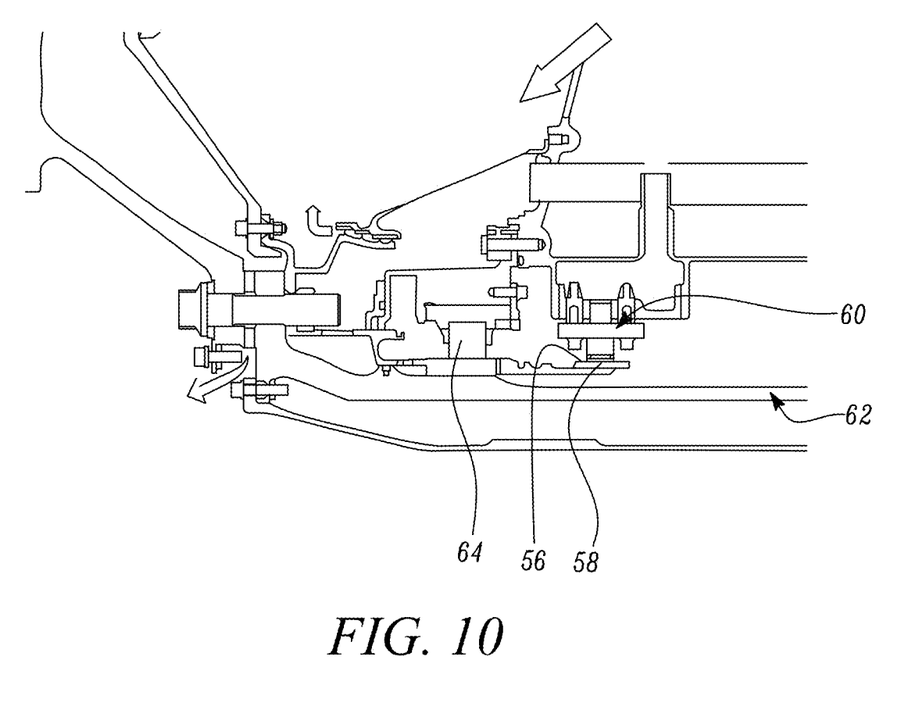
FIG. 10 shows schematically the front end of an interconnecting shaft joining the low pressure turbine to the fan of a non-geared turbofan.

Although described above for monitoring the axial position of the assembly of the fan 23, output shaft 50 and thrust shaft 54, the monitoring system has wider applicability in gas turbine engines, and is not limited to use in geared fan gas turbine engine. For example, it can be used to monitoring the axial position of any interconnecting shaft by which a turbine drives a compressor (e.g. interconnecting shafts 26, 27 in FIG. 1). Typically these interconnecting shafts have a set of ball bearings and a set of roller bearings. FIG. 10 shows schematically the front end of the interconnecting shaft 62 joining the low pressure turbine to the fan of a non-geared turbofan. A front set of roller bearings 64 radially locates the shaft and a rear set of ball bearings (off to the right and thus not shown in FIG. 10) axially locates the shaft. The phonic wheels 56, 58 of the monitoring system are mounted coaxially to the shaft from an extension to the inner case of the roller bearings, and the reluctance probe 60 is mounted to a stationary structure of the engine above the wheels 56, 58. The thrust load on the ball bearings can be rearwards or forwards, depending on engine design, and failure of the bearings causes the shaft 62 to move in the direction of that thrust. As a result, the change in the output signal of the reluctance probe 60 is detected by the engine's EEC.

A suitably adapted monitoring system can also be used to detect failure of the interconnecting shaft 62, although that may not be necessary if the engine has other systems for detecting loss of torque-transmission capability in the shaft.

Although described above in relation to monitoring a thrust shaft (FIGS. 1 to 9) and the fan/compressor end of an interconnecting shaft (FIG. 10), the monitoring system may also be used at other locations in the engine, e.g. for monitoring the axial position of an interconnecting shaft at its turbine section end.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A monitoring system for monitoring an axial position of a rotating shaft, the system including:
   first and second, axially adjacent, phonic wheels which are formed from respective axially adjacent portions of a unitary annular body and mounted coaxially to the rotating shaft for rotation therewith, the first and second phonic wheels having respective first and second circumferential rows of teeth; and
   a sensor configured to detect a passage of the first circumferential row of teeth by generating a first alternating measurement signal component, and to detect a passage of the second circumferential row of teeth by generating a second alternating measurement signal component, the sensor generating a signal having both the first and the second alternating measurement signal components when axially positioned midway between the first and second phonic wheels, the first alternating measurement signal component and the second alternating measurement signal component having amplitudes that are greater than zero when the sensor is axially positioned midway between the first and second phonic wheels, wherein
   the teeth of the first and second circumferential rows are configured such that the first alternating measurement signal component generated by the sensor has an identical frequency to the second alternating measurement signal component generated by the sensor, the first and second circumferential rows of teeth being angularly misaligned such that the first and second alternating measurement signal components are phase shifted relative to each other,
   axial displacement of the rotating shaft causes the signal generated by the sensor to vary the amplitude of the first alternating measurement signal component relative to the amplitude of the second alternating measurement signal component whereby the axial position of the rotating shaft can be monitored, and
   except for the angular misalignment, the teeth of the first circumferential row are substantially identical to the teeth of the second circumferential row.

2. The monitoring system as claimed in claim 1, wherein the first and second circumferential rows of teeth are configured such that the amplitude of the first alternating measurement signal component generated by the sensor when the sensor is axially aligned with the first circumferential row is substantially identical to the amplitude of the second alternating measurement signal component generated by the sensor when the sensor is axially aligned with the second circumferential row.

3. The monitoring system as claimed in claim 1, wherein the teeth of the first circumferential row have a constant height across an axial width of the first phonic wheel, and the teeth of the second circumferential row have a constant height across an axial width of the second phonic wheel.

4. The monitoring system as claimed in claim 1, wherein the first and second circumferential rows of teeth are angularly misaligned such that the first and second alternating measurement signal components are 180° phase shifted relative to each other.

5. The monitoring system as claimed in claim 1, wherein the sensor is a magnetic sensor that detects a varying reluctance caused by the passage of the first and second circumferential rows of teeth.

6. A gas turbine engine for an aircraft comprising:
an engine core comprising a turbine, a compressor, and a core shaft connecting the turbine to the compressor; and
a monitoring system as claimed in claim 1 for monitoring an axial position of the core shaft, the first and second, axially adjacent, phonic wheels being mounted coaxially to the core shaft for rotation therewith.

7. A gas turbine engine for an aircraft comprising:
an engine core comprising a turbine, a compressor, and a core shaft connecting the turbine to the compressor;
a fan located upstream of the engine core, the fan comprising a plurality of fan blades; and,
a gearbox that receives an input from the core shaft and outputs drive to the fan via an output shaft so as to drive the fan at a lower rotational speed than the core shaft;
a thrust shaft that extends through the gearbox to connect the fan to an axial location bearing mounted on the core shaft, thereby relieving the output shaft of responsibility for axially locating the fan relative to the core shaft; and,
a monitoring system for monitoring an axial position of the thrust shaft, the monitoring system including:
first and second, axially adjacent, phonic wheels which are formed from respective axially adjacent portions of a unitary annular body and mounted coaxially to the thrust shaft for rotation therewith, the first and second phonic wheels having respective first and second circumferential rows of teeth; and
a sensor configured to detect a passage of the first circumferential row of teeth by generating a first alternating measurement signal component, and to detect a passage of the second circumferential row of teeth by generating a second alternating measurement signal component, the sensor generating a signal having both the first and the second alternating measurement signal components when axially positioned midway between the first and second phonic wheels, wherein
the teeth of the first and second circumferential rows are configured such that the first alternating measurement signal component generated by the sensor has an identical frequency to the second alternating measurement signal component generated by the sensor, the first and second circumferential rows of teeth being angularly misaligned such that the first and second alternating measurement signal components are phase shifted relative to each other, and
axial displacement of the thrust shaft causes the signal generated by the sensor to vary an amplitude of the first alternating measurement signal component relative to an amplitude of the second alternating measurement signal component whereby the axial position of the thrust shaft can be monitored.

8. The gas turbine engine as claimed in claim 7, wherein:
the turbine is a first turbine, the compressor is a first compressor, and the core shaft is a first core shaft;
the engine core further comprises a second turbine, a second compressor, and a second core shaft connecting the second turbine to the second compressor; and,
the second turbine, second compressor, and second core shaft are arranged to rotate at a higher rotational speed than the first core shaft.

9. The gas turbine engine as claimed in claim 8, further comprising:
an engine electronic controller which is operatively connected to the monitoring system to receive the signal generated by the sensor and is configured to monitor therefrom the axial position of the thrust shaft to which the first and second phonic wheels are mounted.

10. The gas turbine engine as claimed in claim 9, wherein the engine electronic controller converts the signal into a shaft speed, the engine electronic controller monitoring the axial position of the thrust shaft to which the first and second phonic wheels are mounted on the basis of an apparent change in speed of the thrust shaft.

11. A method of identifying an axial shift of a rotating shaft to which first and second phonic wheels are mounted using a monitoring system as claimed in claim 1, the method being carried out by an electronic controller operatively connected the monitoring system, the method including:
receiving the signal having both the first and the second alternating measurement signal components;
determining a rotational speed of the rotating shaft based on the signal; and
identifying the axial shift of the rotating shaft based on a change in the determined rotational speed.

* * * * *